United States Patent
Shah et al.

(10) Patent No.: US 9,758,164 B2
(45) Date of Patent: Sep. 12, 2017

(54) MOTOR VEHICLE CRUISE CONTROL WITH DECELERATION REDUCTION

(71) Applicant: FORD GLOBAL TECHNOLOGIES, LLC, Dearborn, MI (US)

(72) Inventors: Jitendra Shah, Kolkata (IN); Christoph Boerensen, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 99 days.

(21) Appl. No.: 14/870,114

(22) Filed: Sep. 30, 2015

(65) Prior Publication Data
US 2016/0090088 A1    Mar. 31, 2016

(30) Foreign Application Priority Data
Sep. 30, 2014   (DE) .................. 10 2014 219 845

(51) Int. Cl.
*B60W 30/14*    (2006.01)
*B60W 50/00*    (2006.01)

(52) U.S. Cl.
CPC ........ *B60W 30/14* (2013.01); *B60W 50/0098* (2013.01); *B60W 2050/0096* (2013.01); *B60W 2720/106* (2013.01)

(58) Field of Classification Search
None
See application file for complete search history.

(56) References Cited

U.S. PATENT DOCUMENTS

| | | |
|---|---|---|
| 5,924,508 A | 7/1999 | Clauss et al. |
| 2005/0167175 A1 | 8/2005 | Isaji et al. |
| 2010/0056337 A1 | 3/2010 | Huang |

*Primary Examiner* — Rami Khatib
*Assistant Examiner* — Gerrad A Foster
(74) *Attorney, Agent, or Firm* — Frank A. MacKenzie; Brooks Kushman P.C.

(57) ABSTRACT

A method and device for regulating the speed of a motor vehicle, wherein an electronic device a) compares deceleration of a vehicle with a threshold value immediately after a driver switches off a cruise control system and b), if the deceleration exceeds the threshold value, sends a torque demand signal to a powertrain component to reduce the vehicle deceleration to the threshold value or below. The electronic device may further c) compare vehicle acceleration with a second threshold value when the driver switches off the cruise control system, and d), if the acceleration exceeds the second threshold value, send a braking demand signal to a vehicle brake to reduce the vehicle acceleration to the second threshold value or lower.

7 Claims, 1 Drawing Sheet

MOTOR VEHICLE CRUISE CONTROL WITH DECELERATION REDUCTION

CROSS-REFERENCE TO RELATED APPLICATIONS

This application claims foreign priority benefits under 35 U.S.C. §119(a)-(d) to DE 10 2014 219 845.3 filed Sep. 30, 2014, which is hereby incorporated by reference in its entirety.

TECHNICAL FIELD

The invention relates in general to a cruise control system for regulating the speed of a motor vehicle, and specifically to a method and device for preventing undesirably abrupt vehicle deceleration when operation of such a cruise control system is terminated.

BACKGROUND

The speed regulator formed by a device of said type is also referred to as cruise control. The speed regulation may also be enhanced to include distance regulation, in which case the speed is also adapted to that of a vehicle travelling ahead, this commonly being referred to as adaptive cruise control. A method of said type and a device of said type are known in each case from EP 2 162 337 B1 and from US 2005/0167175 A1.

Normally, upon actuation of the brake pedal while a cruise control is engaged, the cruise control is interrupted but not switched completely off, so that the speed regulation function can be reactivated/re-engaged by actuation by the driver of a control such as the accelerator pedal or a switch or button. If the cruise control function is interrupted in this way, the vehicle does not maintain the present speed upon the release of the brake pedal or switch/button, but is decelerated by the engine or motor drag torque, as disclosed in EP 2 162 337 B1 (also published as US2010/056337A1). This reaction may generally be considered desirable owing to the associated feedback to the driver.

Such a reaction also occurs when the cruise control is fully switched off, and is expected by the driver. However, until now, consideration has not been given to the fact that the driver can perceive the switching-off reaction to be disturbing if it results in a vehicle deceleration that is greater (more abrupt) than normal, and other vehicle occupants often perceive this disturbance to an even greater degree. This may arise in particular if the vehicle is loaded in an aerodynamically unfavorable manner. For example, if bicycles or other cargo are loaded on the roof of the vehicle, or if the folding top of a convertible is open, because in those cases air resistance imparts a greater braking action than is otherwise normal for the same vehicle when it is aerodynamically "clean." The sudden vehicle deceleration upon the cruise control being fully switched off may also be more abrupt than normal if the vehicle is travelling on an uphill grade, and conversely, undesirably high acceleration can occur if the vehicle is presently travelling on a downhill grade. Experienced drivers may anticipate such reactions and lightly press the accelerator pedal or the brake pedal before switching off the cruise control.

US 2005/0167175 A1, teaches that the target speed of a cruise control system may be varied in steps (for example, steps of 10 km/h) and that during a change in the target speed the associated deceleration or acceleration is limited to a maximum value so as not to disturb the vehicle occupants. However, said limitation is implemented only for as long as the cruise control is active. If the cruise control is completely switched off, even when it is presently in an interrupted state, undesirable and/or uncomfortable vehicle acceleration or deceleration can occur in the situations described above.

SUMMARY

The invention is based on the object of preventing situations in which vehicle occupants perceive an unexpected vehicle reaction to the cruise control being switched off as disturbing, or of eliminating the need for drivers to anticipate such vehicle reactions.

In a disclosed embodiment, immediately after the driver has given a command to definitively switch off the cruise control, deceleration or acceleration regulation is performed which keeps the switching-off reaction below the threshold value if necessary. With the aid of modern vehicle electronics, the measurement of the deceleration or acceleration occurring immediately after switching off, and the reduction thereof by way of corresponding electronic commands to the engine or motor controller or to the brake system, can be performed so quickly as to be scarcely noticeable to the vehicle occupants, regardless of how unfavorable the above-mentioned aerodynamics or road gradient conditions presently are.

The regulation of the deceleration or acceleration of the motor vehicle is preferably ended when it is no longer required in order to adhere to the threshold value, whether this be because the travelling conditions have changed in the meantime or because of a corresponding pedal actuation by the driver, and thus the method is fully ended, and no further regulation takes place.

The preset threshold value may be equal for deceleration and for acceleration, or two different threshold values may be provided for deceleration and acceleration.

Furthermore, it is self-evidently possible for the method to be used only to counteract excessive vehicle decelerations upon the cruise control being fully switched off, which in practice are likely to occur more commonly than excessive accelerations.

The invention is suitable both for traditional, speed-only cruise control systems and for adaptive cruise control systems, both of which are referred to herein with the generic term "cruise control."

DETAILED DESCRIPTION

As required, detailed embodiments of the present invention are disclosed herein; however, it is to be understood that the disclosed embodiments are merely exemplary of the invention that may be embodied in various and alternative forms. The Figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
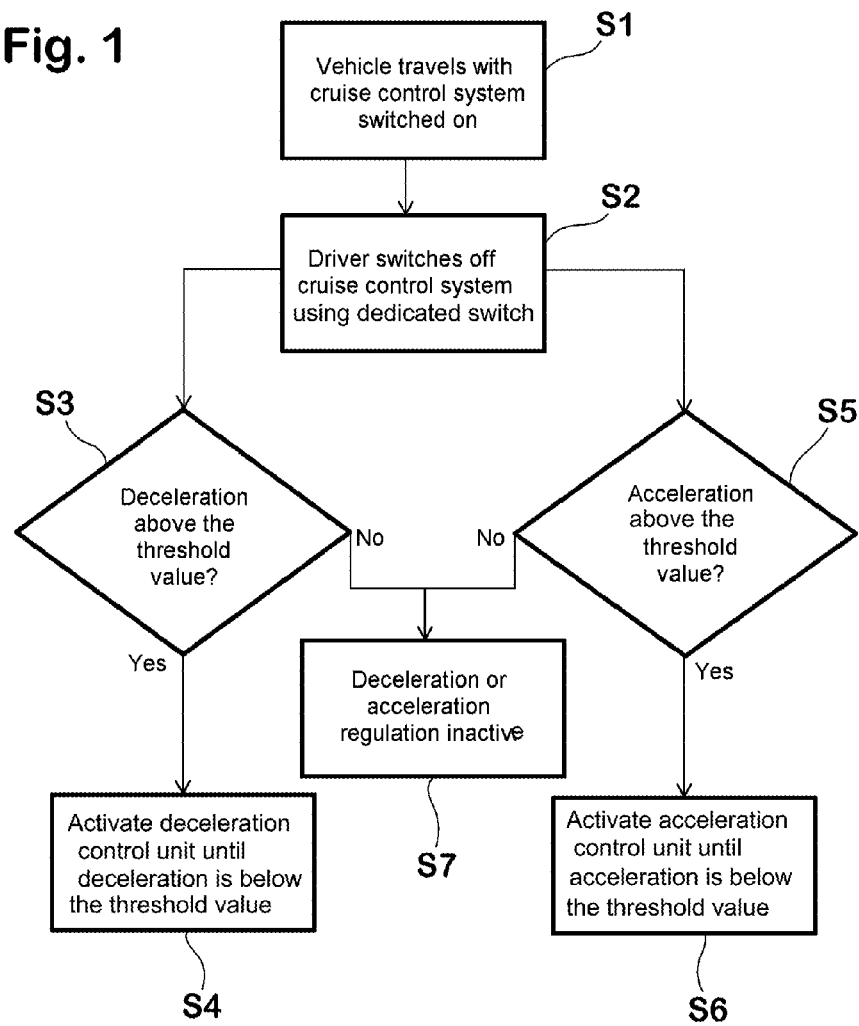
FIG. 1 shows a flow diagram of the procedure carried out upon a cruise control system being switched off.

In step S1 of FIG. 1, a motor vehicle is travelling with a cruise control system or adaptive cruise control system switched on and active, and in step S2, the driver switches off the cruise control system by way of a dedicated operating element, for example by way of a mechanical switch on the dashboard, a switch panel on a touch-sensitive screen, or a corresponding speech command.

The switch-off is full and final in the sense that the cruise control operation can be resumed not by any actuation of an accelerator pedal, but only by actuation of a dedicated operating element.

Immediately after the switch-off, it is checked in step S3 whether the magnitude of the present deceleration of the motor vehicle, as sensed by the vehicle electronics, lies above a preset threshold value, which may amount to for example a few percent of gravitational acceleration (G).

If the magnitude of the present vehicle deceleration lies above the preset threshold value, then in step S4, a deceleration control unit is activated in order to bring the deceleration below the threshold value by way of a suitable torque demand to a powertrain component such as a drive engine or motor of the motor vehicle. The drive engine or motor may be an internal combustion engine or an electric motor. If an electric motor is available as a drive source, for example in the case of an all-electric or hybrid-electric vehicle, a particularly rapid increase in torque is possible by means thereof.

At the same time as step S3, it may be checked in step S5 whether the magnitude of the present acceleration of the motor vehicle, as sensed by the vehicle electronics, lies above a preset threshold value. The acceleration threshold value may be the same as the deceleration threshold value used in step S3 or a different value.

If the magnitude of the present acceleration of the motor vehicle lies above the preset threshold value, then in step S6, an acceleration control unit is activated in order to bring said acceleration below the threshold value by way of a suitable braking demand to one or more brakes of the motor vehicle.

The regulation of the deceleration or acceleration in steps S4 and S6 is ended when the regulation is no longer required in order to adhere to the threshold value, whether this be because the travelling conditions have changed or because of a corresponding pedal actuation by the driver.

If, in steps S3 and S5, it is detected that the magnitude of the present deceleration or acceleration of the motor vehicle lies below the respective threshold value, no regulation is performed (step S7).

In any case, the cruise control remains definitively switched off.

Steps S3 and S5, and S4 and S6, respectively, may in each case also be performed in a single step if the deceleration is treated as a negative acceleration and the threshold values are positive and negative.

Figure 2:
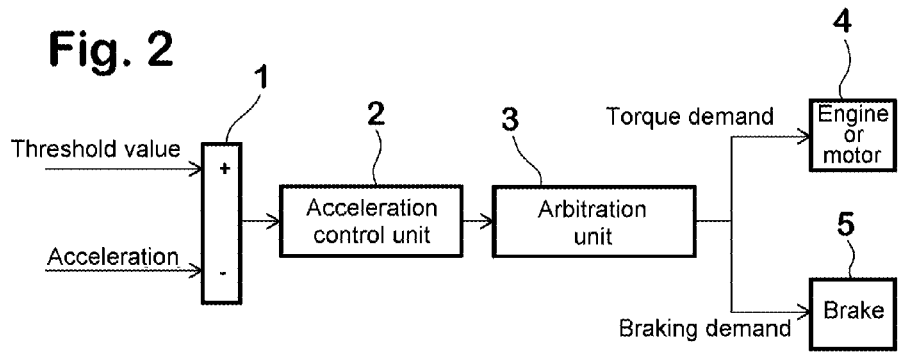
FIG. 2 shows a block diagram of an electronic device for carrying out the procedure shown in FIG. 1.

FIG. 2 shown in the form of a block diagram, an electronic device in which the steps S3 and S5, and S4 and S6, respectively, are performed in each case in only one step.

In FIG. 2, a comparison unit 1 subtracts the measured acceleration, which may also be a deceleration, from a threshold value, and on the basis of the difference, an acceleration control unit 2 calculates whether, and with what positive or negative acceleration value, the present acceleration should be counteracted. An arbitration unit 3 determines whether, for this purpose, an increase in torque of powertrain component 4 (a drive engine or motor, for example) is required or, alternatively, a brake system 5 of the motor vehicle has to be activated, and outputs a corresponding demand to the powertrain component 4 or to the brake system 5. The acceleration control unit 2 and the arbitration unit 3 together form a deceleration/acceleration control unit.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of operating an electronic device to regulate deceleration of a vehicle, comprising:
   comparing, by the electronic device, vehicle deceleration with a threshold value in response to switching off of a cruise control system; and
   while the vehicle deceleration is above the threshold value, increasing torque delivered by a powertrain component to reduce the vehicle deceleration.

2. The method of claim 1, further comprising:
   comparing, by the electronic device, a vehicle acceleration with a second threshold value in response to the switching off of the cruise control system; and
   braking to reduce the vehicle acceleration in response to the comparing indicating the vehicle acceleration is above the second threshold value.

3. The method of claim 1, wherein the powertrain component is an electric motor.

4. A method for operating a vehicle having a cruise control and a control unit, comprising:
   in response to the cruise control being switched from ON to OFF, and in response to deceleration of the vehicle being above a corresponding threshold value, activating the control unit to increase torque delivered by at least one of a vehicle engine and a vehicle electric motor to reduce the deceleration until the deceleration is below the threshold value.

5. The method of claim 4, further comprising:
   operating the control unit to compare vehicle acceleration with a second threshold value in response to the cruise control being switched from ON to OFF via a dedicated switch, and, if the vehicle acceleration is above the second threshold value, operating the control unit to control vehicle braking to reduce the vehicle acceleration.

6. Apparatus comprising:
   a vehicle control unit configured to, in response to a dedicated cruise control operating element being switched from ON to OFF:
   in further response to vehicle deceleration being above a first threshold value, reduce vehicle deceleration by controlling a powertrain component to increase torque until the vehicle deceleration is below the first threshold value; and
   in further response to vehicle acceleration being above a second threshold value, reduce vehicle acceleration by controlling a powertrain component to decrease torque until the vehicle acceleration is below the second threshold.

7. The apparatus of claim 6 wherein the vehicle control unit is further configured to reduce the acceleration by sending a braking demand signal to a vehicle brake.

* * * * *